Patented Mar. 8, 1927.

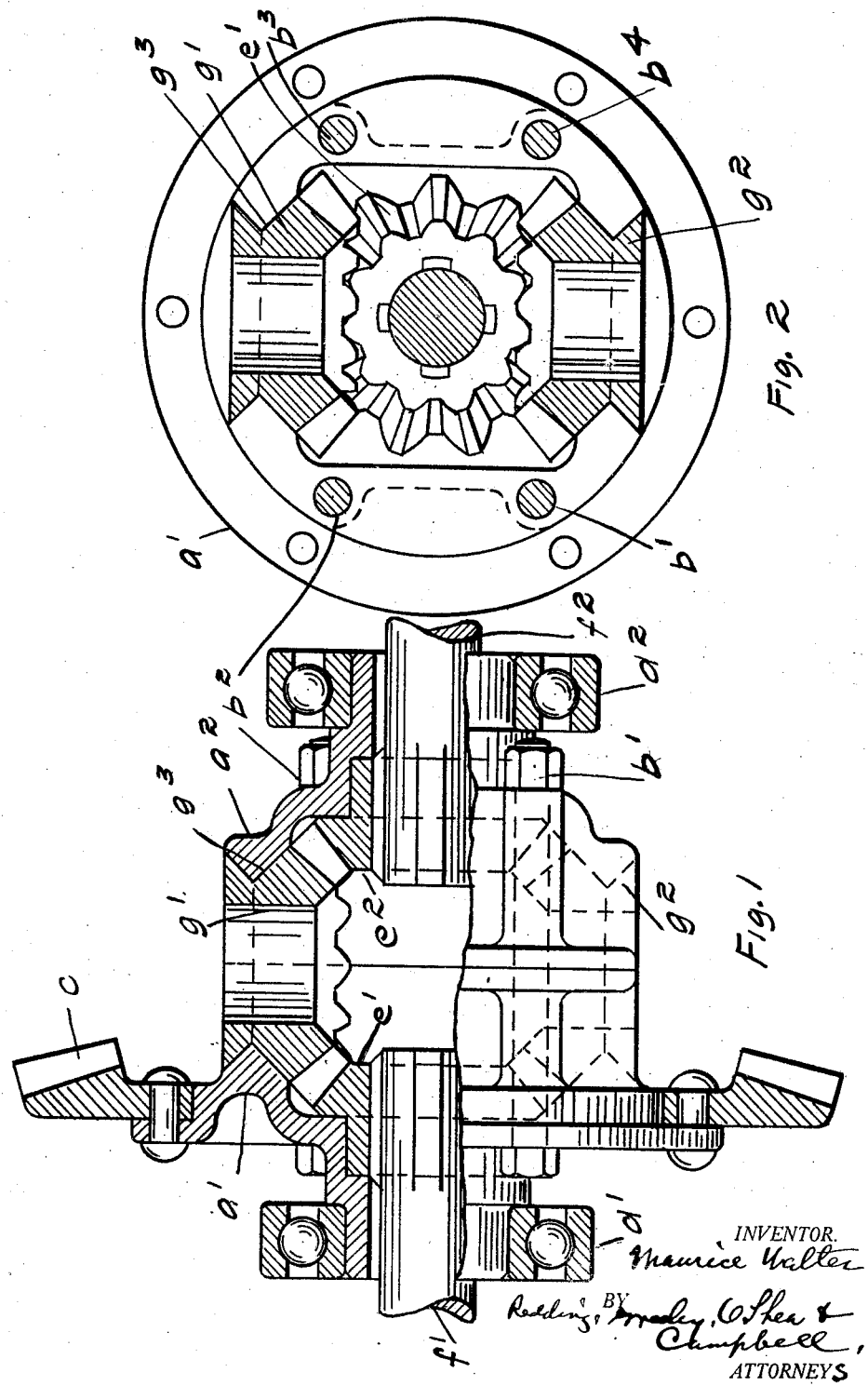

1,620,246

UNITED STATES PATENT OFFICE.

MAURICE WALTER, OF NEW YORK, N. Y.

DIFFERENTIAL GEARING.

Application filed February 10, 1923. Serial No. 618,218.

This invention relates to an improved differential gearing which for purposes of general classification may be considered of the self-locking type. The improvements are designed to provide for the advantages inherent in so-called self-locking differentials and to provide a construction which is simple, efficient, compact and readily assembled and disassembled. In self-locking differentials, as is understood, it is intended that a positive drive shall be afforded and power delivered to both the drive wheels regardless of their relative frictional resistance to turning. It is true, however, that all known differentials of this type have certain inherent disadvantages and it is the object of the present invention to provide a gearing which will deliver power to the drive wheels in proportion to their traction with the road and will have a free and efficient compensating action when the vehicle is rounding corners.

In accordance with the invention it is proposed to journal the planet pinions directly in the differential housing rather than on pins as is the usual practice. In other words, the planet pinions in the present gearing are journaled exteriorly on their hubs rather than interiorly on their bores. Further, it is proposed to deliberately provide the maximum superficial bearing surface for the pinions and form their hubs of such configuration as to enhance the frictional resistance to high speed rotation which will be offered by them. The result secured is that desired, to wit, while the pinions may rotate on their own axes efficiently at low speeds they offer increasing resistance to rotation at higher speeds as when one side of the differential is unloaded and one wheel tends to spin. For convenience in assemblying and disassemblying the differential housing is split on a transverse plane and openings provided at the parting line to receive the hubs of the pinions, these hubs being formed with V grooves which are engaged by correspondingly formed surfaces in the meeting edges of the differential housing.

The invention will be described with greater particularity with reference to the embodiment illustrated in the accompanying drawings, in which:

Figure 1 is a view partly in section and partly in elevation through the improved differential gearing and showing particularly the improved means for mounting it on pinions.

Figure 2 is a view in transverse section taken on the axes of the pinions shown in Figure 1.

The improved differential comprises generally the usual units including a ring gear $c$ bolted on the differential housing which consists of two complementary halves $a'$, $a^2$, adapted to be permanently united by through bolts $b'$, $b^2$, $b^3$, $b^4$, when the parts are assembled, and bevel side gears $e'$, $e^2$, journaled in the differential housing and splined onto the axle sections $f'$, $f^2$, the housing being journaled rotatably in the bearings $d'$, $d^2$. The drive from the rotatable housing to the side gears $e'$, $e^2$, is transmitted through the bevel planet pinions $g'$, $g^2$, of any desired number which mesh with the side gears $e'$, $e^2$. Two such pinions $g'$, $g^2$, are illustrated in the drawings and in the improved differential it is believed that by the added strength gained through the construction thereof and the elimination of supporting pins for the pinions $g'$, $g^2$ and the shearing stresses, two such pinions will serve amply to transmit such loads as vehicles are ordinarily subjected to. The invention resides in the form and means for mounting the pinions $g'$, $g^2$, by which not only is additional strength and compactness secured but high speed rotation of the pinions automatically reduced to a point where power is delivered to the drive wheels substantially in proportion to their traction. The result secured is effected, not through the addition of parts but, in fact, with the elimination of parts generally required. The differential housing being split into two sections $a'$, $a^2$ affords a meeting edge by which the pinions $g'$, $g^2$ may be conveniently mounted or demounted. The hubs of the pinions are grooved circumferentially with a V groove indicated at $q^3$. The included angle of this groove may be changed as required to suit varying conditions. The two halves $a'$, $a^2$ of the housing are so formed as to afford support for the pinions $g'$, $g^2$ when they are brought together, the preferred construction including semi-circular complementary openings at the meeting edges of the two halves which openings are likewise formed with reversely tapered peripheries conforming to the V groove $g^3$. When the parts are assembled, accordingly, the pinions $g'$, $g^2$ are journaled on ample bearing surfaces which effectively resist both axial and lateral thrust. Naturally, bearings laid out on the outside diameters of the hubs of the pinions insure greater strength to the pinions than could be obtained were the pinions journaled on pins passing through their bores. Again, since the outer ends of the hubs of the pinions are flush with the differential casing considerable space is saved in the over-all diameter of the casing as compared to the usual practice in which the supporting pins project inwardly from the inner periphery of the casing to support the sun pinions in spaced relationship to the wall.

The action of the improved differential gearing when the resistance on the two wheels is equal is that ordinarily experienced in that the two side pinions $e'$, $e^2$ with their axle sections revolve at equal speeds and the sun pinions $g'$, $g^2$ have no rotation on their own axes. In rounding a corner in which the differential action between the shafts $f'$, $f^2$ is comparatively uniform and slight the pinions $g'$, $g^2$ rotate on their axes with sufficient freedom to compensate efficiently for such differential rotation. However, in situations where the traction on one wheel is very slight and the tendency is to spin thereby absorbing all of the power to the exclusion of the other wheel high speed rotation of the sun pinions on their own axes might be expected. By the improved construction, however, the external bearings of the pinions $g'$, $g^2$ are of such form and area that any great rotative speed thereof is effectively prevented by the friction generated with the result that under any conditions of operation the power delivered to the two wheels is substantially in proportion to their traction.

Changes in matters of design will suggest themselves but are to be considered within the spirit of the invention if the described results are secured by equivalent means.

What I claim is:

1. In differential gearing, in combination with a rotatable housing, planet pinions each having the hub formed exteriorly with out-board bearing surfaces on which the pinion is journaled in the housing, said bearing surfaces formed to maintain the pinion against axial displacement in both directions within the housing.

2. In differential gearing, in combination with a rotatable housing, side gears journaled therein and splined to the axle shafts respectively, and a plurality of planet pinions meshed with said side gears and journaled directly in the housing by groove bearings having reversely inclined surfaces formed on the exteriors of their hubs.

3. In differential gearing, in combination with a rotatable housing, a plurality of planet pinions having their hubs extended through the wall of the housing and journaled directly therein through groove bearings having reversely inclined surfaces formed on the exteriors of the hubs.

4. In differential gearing, a rotatable housing composed of two halves joined on a transverse meeting line, means to secure the two halves together, and planet pinions having groove bearings having reversely inclined surfaces on the exteriors of their hubs journaled in said halves at their meeting line, said halves being formed with complementary recesses to receive the hubs of said pinions, the peripheries of said recesses being formed complementarily to the groove bearings in said hubs.

5. In differential gearing, in combination with a rotatable housing formed of two halves meeting on a transverse parting line, planet pinions journaled in the housing at said parting line and having their hubs extended through the wall thereof, the exteriors of the respective hubs being formed with V bearing grooves and the meeting halves being recessed to receive the hubs and having the peripheries formed with complementary bearing surfaces to engage in the V grooves.

6. As an article of manufacture, a planet pinion of the character described formed with a cylindrical hub having a V-bearing groove formed in its periphery and radially of the axis of the pinion.

This specification signed this 6th day of February A. D. 1923.

MAURICE WALTER.